United States Patent
Haynes

(10) Patent No.: US 6,232,971 B1
(45) Date of Patent: May 15, 2001

(54) VARIABLE MODALITY CHILD WINDOWS

(75) Inventor: Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,411

(22) Filed: Sep. 23, 1998

(51) Int. Cl.$^7$ .................................................... G06F 3/14
(52) U.S. Cl. ............................................ 345/340; 345/343
(58) Field of Search ...................................... 345/340, 333, 345/332, 339, 343, 352

(56) References Cited

U.S. PATENT DOCUMENTS

| | | | |
|---|---|---|---|
| 5,659,694 | * | 8/1997 | Bibayan ................................ 345/340 |
| 5,825,358 | * | 10/1998 | Silvent et al. ......................... 345/340 |
| 5,838,969 | * | 11/1998 | Jacklin et al. ......................... 395/680 |
| 5,886,694 | * | 3/1999 | Breinberg et al. .................... 345/340 |

\* cited by examiner

*Primary Examiner*—Raymond J. Bayerl
*Assistant Examiner*—Tadesse Hailu
(74) *Attorney, Agent, or Firm*—John Bruce Schelkopf; Andrew Dillon

(57) ABSTRACT

A method and system for generating variable modality child windows. An application is executed utilizing a graphical user interface (GUI) which enables a parent window. One or more child windows may be available to the user during execution. The level of modality of the child window is determined during programming by the application developer. The operating system is modified to permit a variable level of modality during application execution. The developer selects variable modality for one or more of the child windows. When the child window is opened, the user is allowed to interact with the other windows based on the developers determination of level of modality. The variability may be either application or system-wide. The user is thus permitted to interface with only some of the functions on the other windows on the desktop while the child window is open.

18 Claims, 5 Drawing Sheets

VARIABLE MODALITY CHILD WINDOWS

BACKGROUND OF THE INVENTION

1. Field of the Invention

The present invention generally relates to an improved data processing system, and more particular to an improved graphical user interface (GUI) for a data processing system. Still more particular, the present invention relates to an improved GUI for a data processing system where the GUI includes a parent and child windows having variable levels of modality.

2. Description of Related Art

The basic structure of a conventional computer system 10 is shown in FIG. 1. Computer system 10 has at least one central processing unit (CPU) or processor 12 which is connected to several peripheral devices, including input/output devices 14 (such as a display monitor, keyboard, and graphical pointing device) for the user interface, a permanent memory device 16 (such as a hard disk) for storing the computer's operating system and user programs, and a temporary memory device 18 (such as random access memory or RAM) that is utilized by processor 12 to carry out program instructions. Processor 12 communicates with the peripheral devices by various means, including a bus 20 or a direct channel 22 (more than one bus may be provided utilizing a bus bridge).

Computer system 10 may have many additional components which are not shown such as serial, parallel, and USB ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

With further reference to FIG. 2, conventional computer systems often employ a graphical user interface (GUI) to present information to the user. The GUI is provided by software that is loaded on the computer, specifically, the computer's operating system acting in conjunction with application programs. Two well-known GUIs include OS/2 (a trademark of International Business Machines Corp.) and Windows (a trademark of Microsoft Corp.).

Generally speaking, a typical GUI provides application windows of two varieties: a parent window and a child window (also known as a dialog box or secondary window). Typically, a parent window is opened when a user initiates execution of an application program. As execution of the application program continues, the parent window opens various child windows which allow the user to access various functionalities in the application program. For example, a parent window may be opened when a user initiates execution of a word processing program. The parent window will, in turn, open a child window corresponding to each document that the user is editing or creating.

In the example of FIG. 2, a generic application program entitled "Document Manager" is presented by the GUI as a primary application window (parent window) 26 on a display device 28 (i.e., video monitor). In this example, the application window has several child windows 30, 32 and 34 which are usually enclosed by parent window 26. These child windows 30, 32 and 34 depict the contents of various files or documents that are handled by the program. A menu bar 36 with a standard set of commands, a toolbar 38, and a status bar 40 may also be provided as part of the GUI, to simplify manipulation and control of the objects (e.g., text, charts and graphics) within the child windows. Windows can overlap one another, in multiple layers. A graphical pointer 42 in the form of an arrowhead is controlled by a pointing device (mouse) in order to manipulate objects in the GUI.

"Modality" refers to the level of interaction allowed when a child window has been opened. It is a description of the ability of the user to interface with other windows, besides the present child window, while the child window is displayed on the GUI.

Application developers today working in common industry-standard operating system environments (such as Microsoft Windows, UNIX) can create child windows as "descendants" of parent application windows. The child windows can contain an attribute that allows them to either be non-modal or modal. Conventional operating systems GUIs allow the application programmer to determine the modal state of the child windows. The child windows are either modal or non-modal (modeless). Modal refers to a type of movable window, fixed in size, that requires a user to enter information before continuing to work in the application window from which it is displayed. For example, when a user invokes the save command on a typical word processing software, the user has to complete the save request or exit the child window before he can interact with the text on the parent window. Modeless or non-modal is a type of movable window, fixed in size, that allows users to continue their dialog with the application without entering information in or closing the child window. In the above example, if the save child window is modeless, the user is able to interact with the text on the parent window without first saving the document or exiting from the child window.

When an application displays a modal dialog box, the window that owns the dialog box is disabled, effectively suspending the application. The user must complete interaction with the modal dialog before the application can continue.

A modal dialog is usually created and activated through the Dialogbox function. This function creates a dialog window from a dialog template resource and displays the dialog as a modal dialog. The application that calls the Dialogbox function supplies the address of a callback function; Dialogbox does not return until the dialog box is dismissed through a call to EndDialog made from this callback function (possibly in response to a user-interface event, such as a click on the OK button). Modal windows may be system modal or application modal. When a child window is system modal, the user may interact only with that child window; no other window on the desktop can be interacted with until the child window is closed. In contrast, if child window is application modal, the user may interact with other desktop windows which are not affiliated with the same application parent window as the child window. Affiliated application windows will not respond to user-interactions until the child window is closed. A child window which is non-model permits user interaction with all other windows on the desktop, even those affiliated with the application and regardless of whether or not the child window is open.

Presenting a modeless dialog does not suspend execution of the application by disabling the owner window of the dialog box. However, modeless dialogs usually remain on top of their owner window even when the owner window gains focus. Modeless dialogs represent an effective way of continuously displaying relevant information to the user.

A modeless dialog is typically created through the CreateDialog function. As there is no equivalent of the DialogBox function for modeless dialog, applications are responsible for retrieving and dispatching messages for the modeless dialog. Most applications do this in their main message loop; however, to ensure that the dialog responds to keyboard events as expected and enables the user to move between controls using keyboard shortcuts, the application must call the IsDialogMessage function. A modeless dialog does not return a value to its owner. However, the modeless dialog and it owner can communicate using SendMessage calls.

FIG. 3 depicts a display device 70 (i.e., video monitor) of a computer system GUI in accordance with the prior art. In the figure, the GUI displays an active parent window 76 having one child window 80 open. The GUI further presents a background area or "desktop" 72 on display device 70 wherein the application windows and other software features (dialog boxes, icons, etc.) are placed on top of desktop 72. A graphical pointer 78 in the form of an arrowhead is provided to allow the user, through manipulation of a pointing device of the computer system, to select, highlight and activate various objects or features of the GUI. Child window 80 may include other pushbuttons. Only the save options "No" 82, "Yes" 83a and "Exit" 83b, are illustrated here.

Child window 80 is active in the sense that it has been placed "on top" of the GUI, i.e., foremost (prominent) with respect to other application windows such as the active parent window 76 and inactive application window 74. In the "on top" position, the operating system redirects user inputs (e.g., from a keyboard) to this child window 80. In the particular configuration shown, child window 80 is sized and positioned within desktop 72 so as to cover (partially obscure) inactive application window 74 or active parent window 76 and child windows, if any, of inactive application window 74.

In the example depicted in FIG. 3, a child window has been launched in response to a user attempting to close a text editor. The program puts up an application-modal message child window 80 that asks the user if he wants to save his changes. Suppose the user would like to study the online help for the application before selecting "Yes" 82b or "No" 82a. Today the user is unable to select Help from the main window pull-down menu, and would be stuck (i.e. unable to access the Help feature) if the developer did not also include a Help pushbutton on the message window.

European pat No. 463,250 refers to semi-modal dialog boxes; however, it specifically refers to the relationship between two or more child windows subservient to a parent window, and not on the inherent relationship between a child window and its parent as this invention does. For example, it considers situations where opening a child window for an application might not assure data integrity if a different child window is already existent. In such a case, the new child window would not be allowed creation. This present invention does not cover such situations. Rather, it invents compromise window manipulation possibilities for parent windows based on levels of modality context in a child window, independent of any other child windows.

Occasionally, a developer might want the window to be something in-between totally modal and totally non-modal. For example, the user may want to select the Help item from the menu of the parent window as explained above. There is no way to specify and implement this today. It would, therefore, be desirable to devise an improved GUI interface that allowed for child windows of variable modality. It would be further advantageous if the GUI interface permitted the programmer to specify the level of modality for each component of the child windows.

SUMMARY OF THE INVENTION

It is therefore one object of the invention to provide an improved data processing system.

It is another object of the present invention to provide an improved graphical user interface (GUI) for a data processing system.

It is yet another object of the present invention to provide an improved GUI for a data processing system where the GUI includes a parent and child windows having variable levels of modality.

The foregoing objects are achieved in the following manner. An application which is executed utilizing a graphical user interface (GUI) which enables a parent window is disclosed. One or more child windows may be available to the user during execution. The level of modality of the child window is determined during programming by the application developer. The operating system is modified to permit a variable level of modality during application execution. The developer selects variable modality for one or more of the child windows. When the child window is opened, the user is allowed to interact with the other windows based on the developers determination of level of modality. The variability may be either application or system-wide. The user is thus permitted to interface with only some of the functions on the other windows on the desktop while the child window is open.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
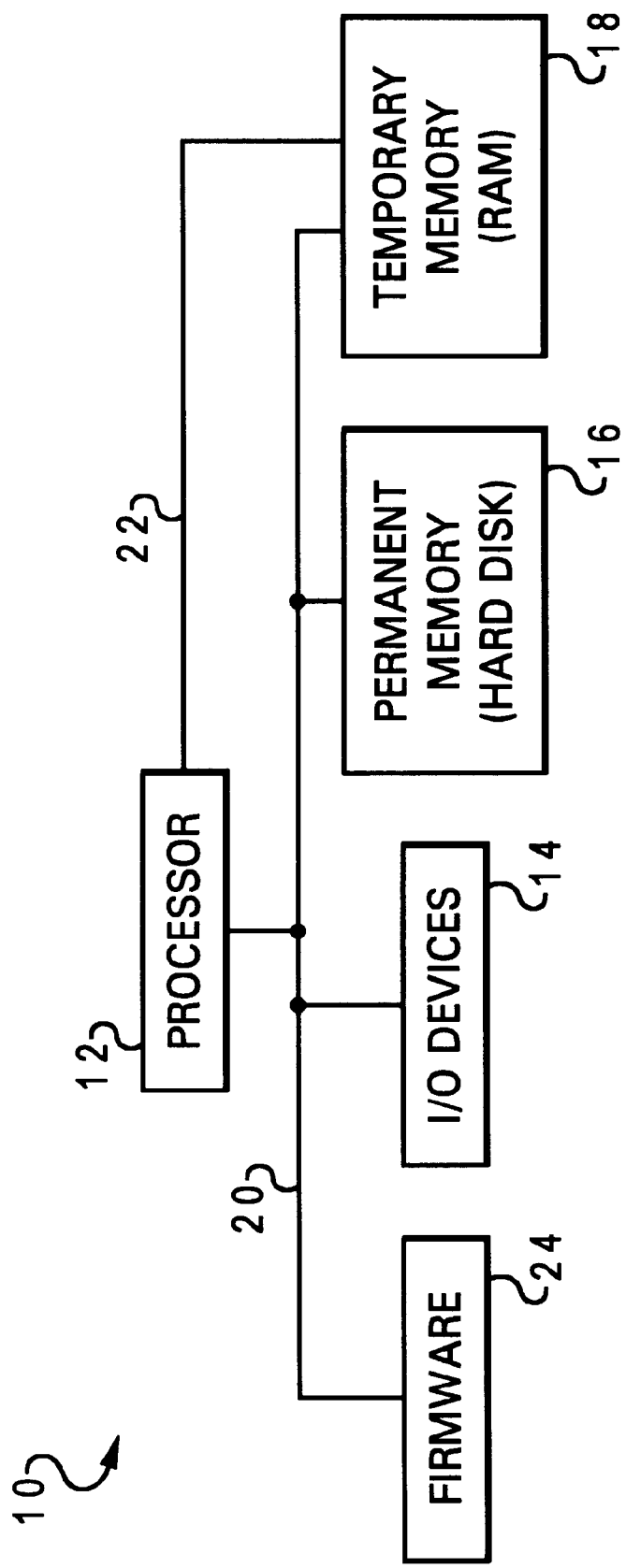
FIG. 1 is a block diagram of a conventional computer system.
Figure 2:
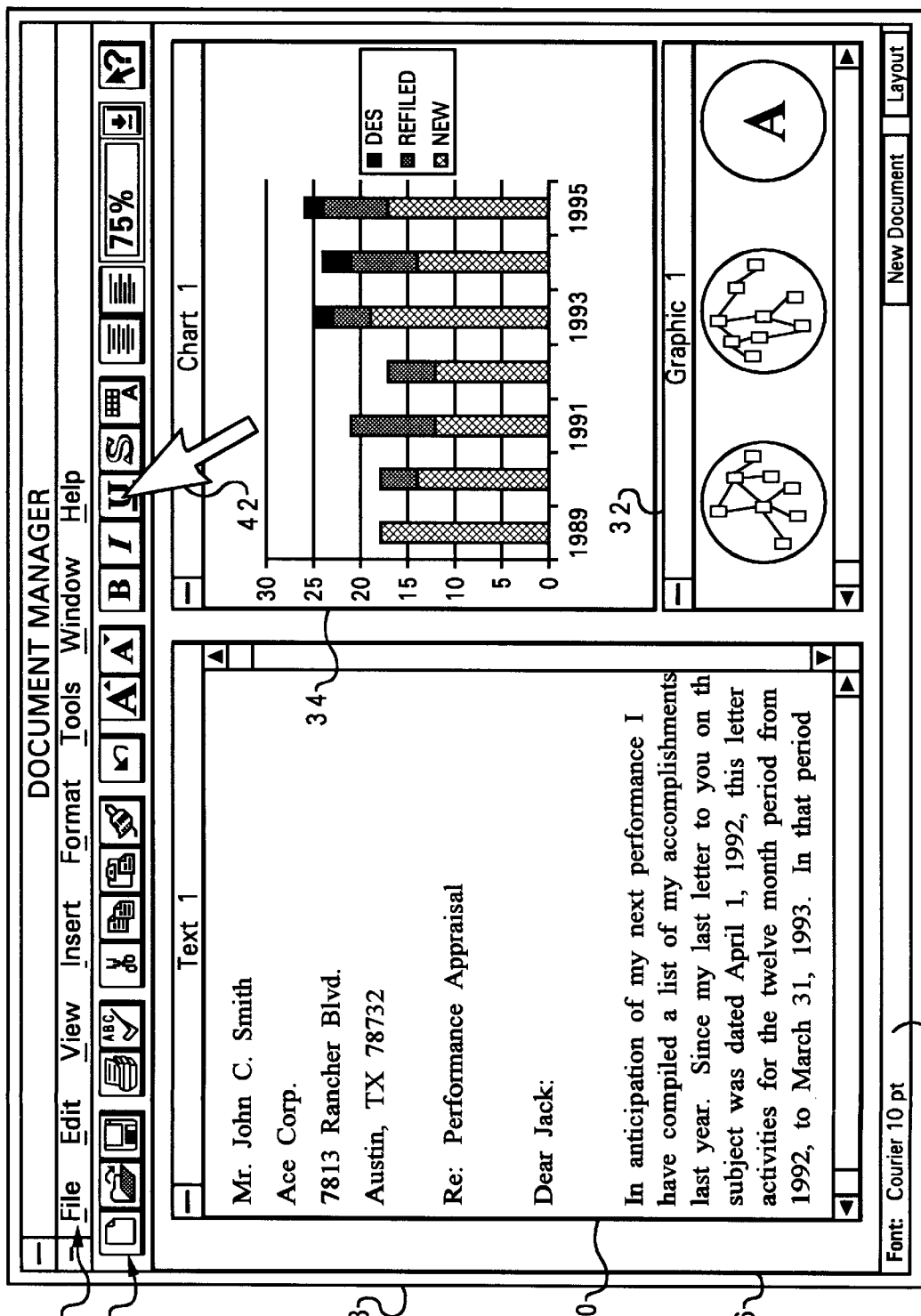
FIG. 2 is an illustration of a computer display showing a conventional graphical user interface (GUI) which provides a parent window and child windows, and various other objects such as a menu bar, a toolbar, and a status bar for a parent window, and a graphical pointer for the GUI.

The present invention is directed to a computer operating system having a graphical user interface (GUI) which allows a programmer to set the level of modality for the child windows of the GUI, e.g., non-modal, system modal, application modal, and variable modal. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense. The GUI of the present invention may further be adapted for use with existing operating systems such as OS/2 (a trademark of International Business Machines Corp.) or Windows 95 (a trademark of Microsoft Corp.). Users of these systems are accustomed to interfacing with GUI objects such as status bars, toolbars, items selectable from menu bar pull-downs, etc.

Figure 4:
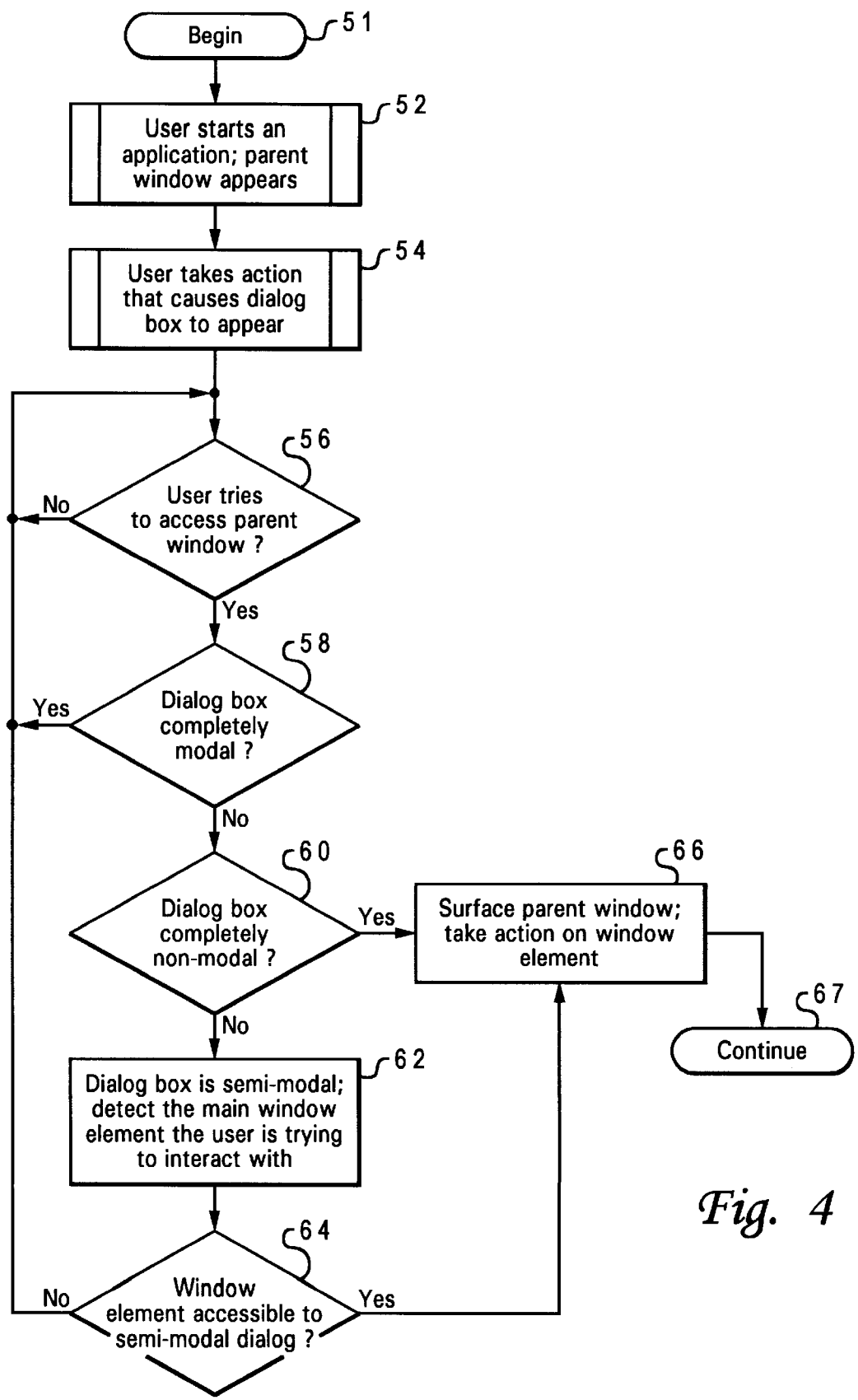
FIG. 4 is a logic flow diagram illustrating one implementation of the use of child windows in accordance with the present invention to provide variable modality, wherein the GUI responds to user input based on the level of modality set by the programmer of the application.

With reference now to FIG. 4, the present invention introduces the concept of pre-selecting modal options for GUI child windows, particularly based on programmer's desire for user interfacing. FIG. 4 depicts a logic flow control diagram of the steps involved in the program implementation and selection of modality for the user interface according to one embodiment of the present invention. The application is commence by the user as shown in block 51. A parent window is launched as illustrated in block 52. At some point during user interaction with the application, the parent window brings up a child window as depicted in block 54. When the user attempts to access the parent window while displaying a child window as shown in block 56, a series of logic steps depicted in blocks 58 and 60 are triggered to determine if the application modality supports this interface. The system checks for the modality of the child window. It first determines if the child window is completely modal as illustrated in block 58, or completely non-modal as illustrated in block 60. If completely modal then the user is denied access to the parent window. If completely non-modal, the user is allowed access to the parent window and all other application windows. When the child window is neither completely modal nor completely non-modal, then it is variable modal as shown in block 62. Once this is determined, the system checks the parent window element the user is trying to interact with to determine the particular modality of the desired user interface as shown in block 64 and allows or disallows access to the parent window based on the original programmer's determination. If the window element is one which is accessible to the user based on the child window's pre-defined variable modality, the user is permitted to interact with the parent window element as illustrated in block 66. If the element is not accessible, no action is taken on the parent window. The process terminates at block 67 once interaction is allowed with the parent window.

Figure 3:
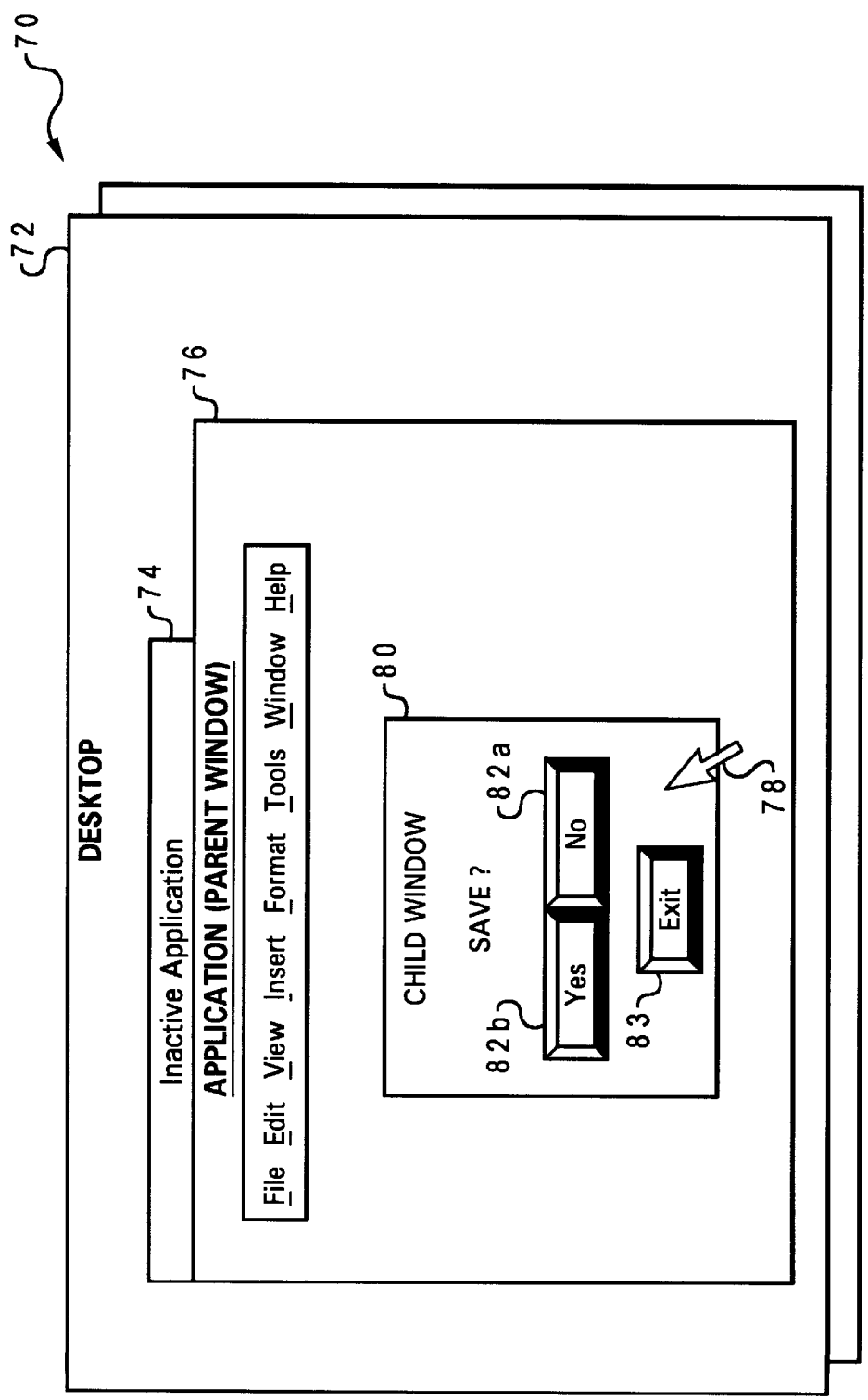
FIG. 3 is an illustration of a GUI according to prior art wherein a modal child window is presented.
Figure 5:
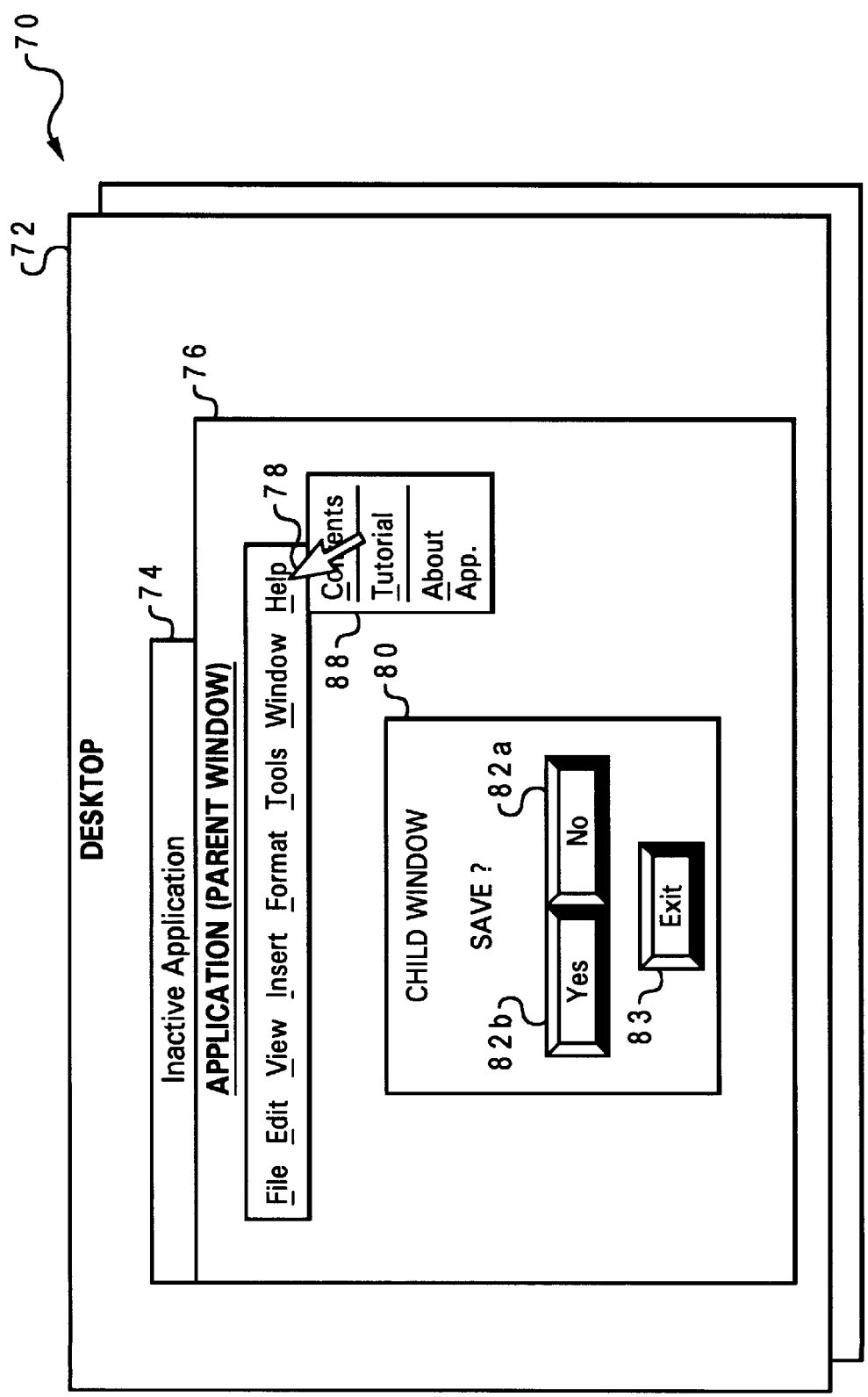
FIG. 5 is one illustration of a computer display according to the present invention depicting a child window with variable modality as to the menu items of the parent window with the Help item selected form the application parent window.

FIG. 5 depicts a display device 70 with its various numbered elements as described in FIG. 3 above. However, in accordance with the present invention, FIG. 5 also depicts the Help menu box 88 selected from active parent window 76. As described above, the GUI displays an active parent window 76, having child window 80 open, along with a graphical pointer 78 in the form of an arrowhead to allow the user, through manipulation of a pointing device of the computer system, to select, highlight and activate various objects or features of the GUI.

The GUI of the present invention includes appropriate program instructions that allow a user, administrator, or programmer to select options from the non-active windows of the GUI, based on one or more programmed criteria. In the example of FIG. 5, a variable child window is illustrated based on variable system and application modality.

In FIG. 5, the presentation scheme has been designed to reflect a variable modal child window which is system modal. Here the application developer has allowed the user to select the Help option of the parent application while the child window is open. No other menu item may be selected without first closing the child window.

Any number of modal options are possible. In the illustrated example of FIG. 5, only the Help menu item may be selected. Alternatively, other embodiments may permit a range of different forms of variable modality, such as interfacing the Edit pull-down menu, or both the View and Edit pull-down menu, or any other combination as determined by the programmer when developing the application to improve its functionality.

The foregoing example provides a method of programmed modality based upon the programmer's perceived functionality of the application. Other examples of how the present invention might be used is where the application developer might want the user to dispose of the child window before performing certain interactions with other application windows, but not all—it may be deemed appropriate, for instance, that the user be allowed to minimize or maximize, or restore the primary application window, but not close it. Additionally, the user may be permitted to move or resize the child windows. Also, the programmer may permit the child window to submerge below the parent window during specific user interactions with the parent window.

The present invention may be carried out by providing an operating system or modifying current systems to support and enable such semi-modal specificity. Application development environments (eg. Java, Visual C++) would need to document and handle developer usage. They must enable the application developer to specify the levels of modality, and then set control options that govern the manner in which the application's GUI child windows interact. The variable level specified by the application developer would distinguish between system and application levels of modality, and then for each may allow granular, disparate specifications of user interaction. Additionally, the software includes appropriate program instructions to handle any conflicts in the modal settings, such as where there are two or more open applications with Help menu items.

The examples of FIGS. 4 and 5 discuss modality for child windows, but the present invention may be applied to a much larger group of modal child window operations, including all of the elements discussed in the Background of the Invention.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the foregoing description applies to GUIs for computer systems such as personal computers (PCs), the present invention is not limited to use with PCs as it could be implemented on minicomputers, mainframes, or any other data processing equipment which presents information in the form of child windows. It is therefore contemplated that such modifications can be made without departing from the spirit or scope of the present invention as defined in the appended claims.

What is claimed is:

1. A method of improving child window functionality of a computer application, said method comprising the steps of:
   providing a plurality of modality levels including a variable level modality for a child window of said computer application;
   designating a variable level modality of said child window to an operating system associated with said computer application, wherein said variable level modality distinguishes between a system and an application level and allows access to permitted features outside of said child window while said child window is opened;
   in response to a selection of a feature outside of said child window while said child window is open, determining that said feature is a permitted feature external to said child window; and
   in response to said determining step, accessing said feature.

2. The method of claim 1, wherein said designating step further provides granular, disparate specifications of user interaction outside of said child window.

3. The method of claim 2, wherein said accessing step includes minimizing, maximizing and restoring a parent window associated with said child window.

4. The method of claim 2, further comprising the step of submerging said child window below the parent window when said permitted feature is selected.

5. The method of claim 2, wherein said accessing step accesses a menu item selection from a parent window associated with said child window.

6. The method of claim 1, further comprising the steps of:
   providing a graphical user interface with selection options for child window modality, including full modality, non-modality, and variable modality;
   in response to a receipt of a user selection, associating a selected one of said selection options with said child window of said computer application.

7. The method of claim 6, further comprising the steps of toggling said variable level modality on in response to a user selection of said variable modality from among said selection options.

8. A data processing system for improving child window functionality of a computer application, said data processing system comprising:
   a processor;
   an operating system executed via said processor; and
   program instructions executed by said processor that provides:
      a modality selection function providing a plurality of modality levels for a child window of said computer application and which includes means for designating to the operating system a variable modality for said child window; and
      a response utility that, in response to a selection of a feature outside of said child window while said child window is open, determines that said feature is a permitted one of a set of external features, that can be accessed while said child window is open and accesses said feature.

9. The data processing system of claim 8, wherein said modality selection function distinguishes between system and application levels of modality.

10. The data processing system of claim 9, wherein said modality selection function provides features by which a user may minimize, maximize, and restore a parent window of said child window.

11. The data processing system of claim 9, wherein said modality selection function provides that a child window may be submerged below the parent window for certain specified user interactions.

12. The data processing system of claim 9, wherein said modality selection function further permits a a user access to a menu selection of a parent window of said child window.

13. A computer program product comprising:
   a storage medium adapted to be read by a computer; and
   program instructions stored on said storage medium for enabling a variable level modality for a child window of a computer application, by (1) implementing a programming environment, which allows an application developer to select one of a plurality of modalities for a child window including said variable level modality which provides access to particular features outside of said child windows, and (2) designating the variable level modality for said child window.

14. The computer program product of claim 13, wherein said program instructions further includes instructions for designating to the operating system the variable level modality for said child windows.

15. The computer program product of claim 13, wherein said program instructions includes instructions for distinguishing between system and application levels of modality.

16. The computer program product of claim 15, wherein said program instructions includes instructions that allow a user to minimize, maximize, and restore a parent window of said child window while said child window is open.

17. The computer program product of claim 15, wherein program instructions includes instructions for submerging a child window below a parent window for certain specified user interactions.

18. The computer program product of claim 15, wherein program instructions includes instructions for allowing a user to access a selected menu of a parent window of said child window.

* * * * *